US008506209B2

(12) United States Patent
Hecht

(10) Patent No.: US 8,506,209 B2
(45) Date of Patent: Aug. 13, 2013

(54) ADJUSTABLE CUTTING TOOL

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 48 days.

(21) Appl. No.: 13/415,452

(22) Filed: Mar. 8, 2012

(65) Prior Publication Data
US 2013/0028671 A1 Jan. 31, 2013

Related U.S. Application Data

(60) Provisional application No. 61/511,836, filed on Jul. 26, 2011.

(51) Int. Cl.
*B23B 27/16* (2006.01)
*B23B 29/12* (2006.01)
(52) U.S. Cl.
USPC .............................................. 407/77; 407/78
(58) Field of Classification Search
USPC .......................................... 407/77, 78, 85, 86
See application file for complete search history.

(56) References Cited

U.S. PATENT DOCUMENTS

| 1,716,762 | A | | 6/1929 | Buxbaum | |
|---|---|---|---|---|---|
| 2,346,084 | A | * | 4/1944 | Sanocki | 407/64 |
| 2,369,555 | A | * | 2/1945 | Freeman | 407/87 |
| 3,520,042 | A | | 7/1970 | Stier | |
| 3,802,043 | A | | 4/1974 | Garih | |
| 3,853,422 | A | * | 12/1974 | Benjamin et al. | 408/161 |
| 5,098,232 | A | | 3/1992 | Benson | |
| 5,967,705 | A | * | 10/1999 | Wermeister | 407/39 |
| 7,014,393 | B2 | * | 3/2006 | Matheis | 407/37 |
| 7,857,557 | B2 | * | 12/2010 | Lehmann et al. | 408/153 |
| 2008/0152441 | A1 | | 6/2008 | Andersson et al. | |
| 2008/0253847 | A1 | | 10/2008 | Nicholas | |

FOREIGN PATENT DOCUMENTS

DE 449071 C 8/1927

OTHER PUBLICATIONS

International Search Report dated Oct. 15, 2012 issued in PCT counterpart application (No. PCT/IL2012/050239).

* cited by examiner

*Primary Examiner* — Will Fridie, Jr.
(74) *Attorney, Agent, or Firm* — Womble Carlyle

(57) ABSTRACT

A cutting tool has a cutting insert, a tool holder, and an adjustment member. The tool holder includes an insert holder portion and a shank portion, the insert holder portion being rigidly fixed to the shank portion. The cutting insert is removably secured to the insert holder portion by a fastener, at a cutting position in which the operative cutting portion encounters a workpiece at an insert cutting angle. The adjustment member is a non-threadingly retained on the insert holder portion, and operatively connected to the cutting insert. Actuation of the adjustment member causes an increase or decrease of the insert cutting angle.

25 Claims, 6 Drawing Sheets

ADJUSTABLE CUTTING TOOL

RELATED APPLICATIONS

This application claims priority to U.S. Provisional Patent Application No. 61/511,836, filed 26, Jul. 2011, whose contents are incorporated by reference in their entirety.

FIELD OF THE INVENTION

The present invention relates to an adjustable cutting tool for use in metal cutting processes in general, and for threading operations in particular.

BACKGROUND OF THE INVENTION

Within the field of cutting tools used in threading operations, exchangeable anvils or shims directly supporting a removably securable threading insert have long since provided a way to adjust the inclination angle of the threading insert to equal the helix angle of the thread being cut, and thus provide equal clearance for the cutting edges.

U.S. Pat. No. 3,520,042 discloses an adjustable holder for a thread cutting insert which eliminates the need for exchangeable anvils or shims. The adjustable holder comprises a shank with a recess in the form of a partial cone, and a mating partially conical block disposed in the recess. The thread cutting insert is mounted on the conical block by means of a set screw, and the conical block is angularly adjustable within the recess so as to provide alignment between the plane of symmetry of the cutting insert and the helix angle of the thread being cut. A slot in the shank is angularly aligned with a radial threaded bore in the conical block, and a bolt located in the slot engages the threaded bore to clamp the conical block in the recess at its adjusted position.

US 2008/0253847 discloses a tool holder assembly which incorporates a cutting edge adjustment member that does not contact the cutting insert. The tool holder assembly also includes a tool holder and an insert holder, with the cutting insert being mounted in the insert holder by a screw and a clamp, and an outside curved surface of the insert holder configured to mate with a curved arcuate surface of an insert receiving end of the tool holder. The cutting edge adjustment member is in the form a precision ground adjustment washer having an angled top surface. An adjustment bolt, having a head that rests on the angled top surface of the adjustment washer, protrudes through a slot in the insert receiving end and engages a threaded hole in the insert holder. The angle of the top surface determines the rotational position in the slot at which the bolt engages the threaded hole and thus defines a particular cutting edge angle. The adjustment washer can be re-oriented or exchanged for another adjustment washer with different angle of top surface to define a different cutting edge angle.

It is an object of the present invention to provide an improved adjustable cutting tool.

It is also an object of the present invention to provide an adjustable cutting tool without exchangeable anvils or shims.

It is a further object of the present invention to provide an adjustable cutting tool without separate shank and insert holder components.

It is yet a further object of the present invention to provide an adjustable cutting tool having a readily accessible and operator friendly means of adjustment.

SUMMARY OF THE INVENTION

In accordance with the present invention, there is provided a cutting tool comprising:

a cutting insert, a tool holder, and an adjustment member;
the cutting insert having at least one cutting portion,
the tool holder having an insert holder portion and a shank portion, the insert holder portion being rigidly fixed to the shank portion,
the adjustment member being non-threadingly retained on the insert holder portion, and operatively connected to the cutting insert, and
the cutting insert being removably secured to the insert holder portion by means of a fastener, at a cutting position in which the operative cutting portion encounters a workpiece at an insert cutting angle,
wherein actuation of the adjustment member causes an increase or decrease of the insert cutting angle.

Also in accordance with the present invention, there is provided a method of increasing or decreasing an insert cutting angle of a cutting tool relative to a workpiece, the cutting tool comprising:

a cutting insert, a tool holder, and an adjustment member;
the cutting insert having at least one cutting portion,
the tool holder having a insert holder portion and a shank portion, the insert holder portion being rigidly fixed to the shank portion,
the insert adjustment member being non-threadingly retained on the insert holder portion, and operatively connected to the cutting insert, and
the cutting insert being removably secured to the insert holder portion by means of a fastener,
the method comprising the steps of:
untightening the fastener,
actuating the adjustment member without removing any components from the cutting tool, and
retightening the fastener.

BRIEF DESCRIPTION OF THE DRAWINGS

For a better understanding, the invention will now be described, by way of example only, with reference to the accompanying drawings in which chain-dash lines represent cut-off boundaries for partial views of a member and in which.

DETAILED DESCRIPTION OF THE INVENTION

Figure 1:
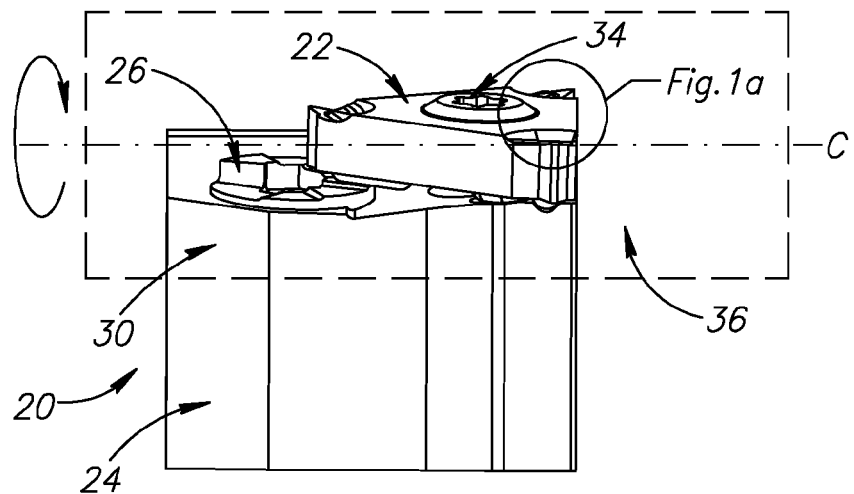
FIG. 1 is a perspective view of a cutting tool in accordance with a first embodiment of the present invention.

Attention is first drawn to FIGS. 1 to 3, 8 and 9, showing a cutting tool 20, 120 in accordance with some embodiments of the present invention. The cutting tool 20, 120 includes a cutting insert 22, a tool holder 24, and an adjustment member 26, 126.

The cutting insert 22 has at least one cutting portion 28 and may be manufactured by form pressing and sintering a cemented carbide, such as tungsten carbide, and may be coated or uncoated.

The tool holder 24, which may be manufactured from hardened steel, has an insert holder portion 30, 130 and a shank portion 32, the insert holder portion 30, 130 being rigidly fixed to the shank portion 32.

The adjustment member 26, 126, having a first axis A1, is non-threadingly retained on the insert holder portion 30, 130 and operatively connected to the cutting insert 22.

In some embodiments of the present invention, the adjustment member 26, 126 may be a non-threaded component.

The cutting insert 22 is removably secured to the insert holder portion 30, 130 by means of a fastener 34, at a cutting position in which the operative cutting portion 28 encounters a workpiece 36 at an insert cutting angle α.

In some embodiments of the present invention, the cutting insert 22 may be an indexable threading insert with a plurality of cutting portions 28, each cutting portion 28 having two cutting edges 38, 40, and the cutting tool 20, 120 may be used in threading operations.

Figure 1A:
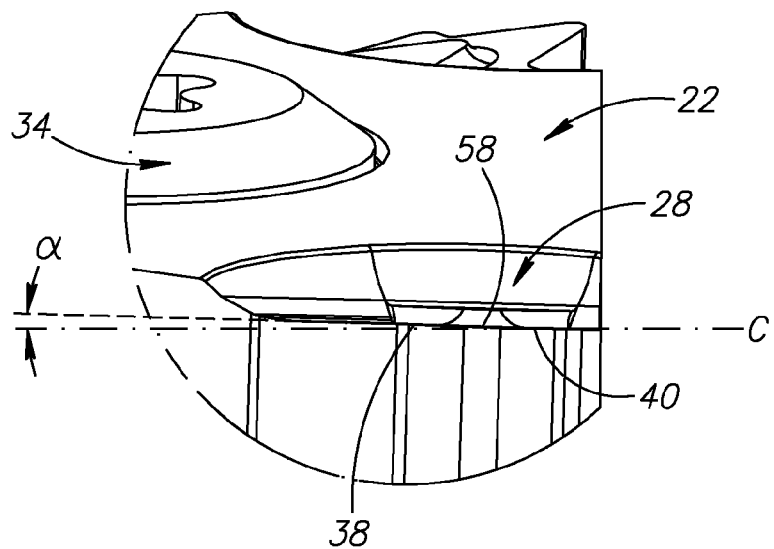
FIG. 1a is a detailed perspective view of the cutting tool shown in FIG. 1.
Figure 8:
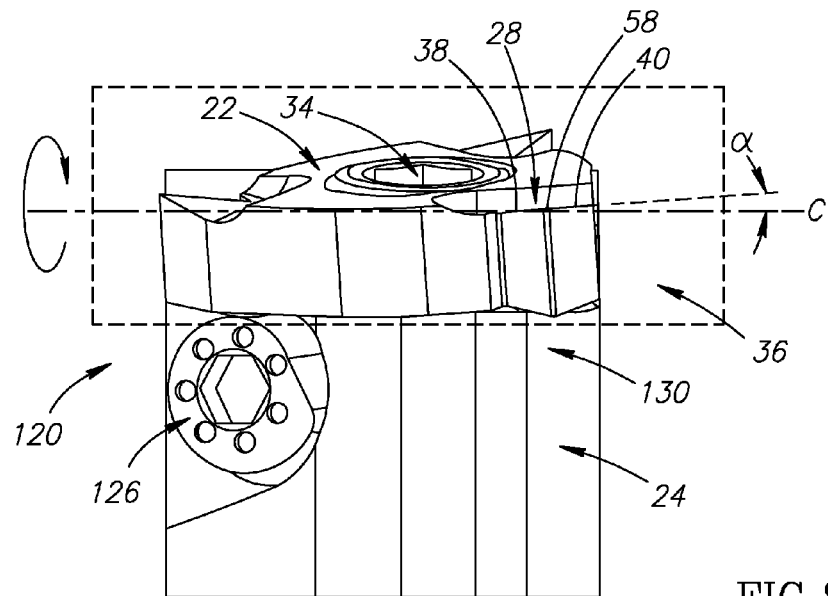
FIG. 8 is a perspective view of a cutting tool in accordance with a second embodiment of the present invention.

For threading operations, as shown in FIGS. 1*a* and 8, the insert cutting angle α is the inclination angle of the two cutting edges 38, 40 of the operative cutting portion 28 relative to a central axis C of the rotating workpiece 36. The inclination angle of a threading insert is a well known term used in the field of threading operations and typically adjusted to equal the helix angle of the thread being cut, in order to provide equal clearance for both cutting edges.

Actuation of the adjustment member 26, 126, causes an increase or decrease of the insert cutting angle α.

It should be understood that throughout the description and claims of the present invention, the term "actuation" describes the act of initiating movement of the adjustment member 26, 126 in a predetermined direction or along a predetermined path.

In some embodiments of the present invention, the cutting tool 20, 120 may have a single adjustment member 26, 126.

Also, in some embodiments of the present invention, actuation of the adjustment member 26, 126 may be performed without removing any components from the cutting tool 20, 120.

To change the insert cutting angle α, one may first partially unclamp the cutting insert 22, rotate the adjustment member 26, 126, and then clamp the cutting insert 22 once again. A method of increasing or decreasing the insert cutting angle α of the cutting tool 20, 120 comprises the steps of:
 untightening the fastener 34,
 actuating the adjustment member 26, 126, and
 retightening the fastener 34.

Following the untightening of the fastener 34, actuation of the adjustment member 26, 126 may be performed by rotating the adjustment member 26, 126 about its first axis A1.

The insert cutting angle α may be increased by rotating the adjustment member 26, 126 in one direction about its first axis A1 and decreased by rotating the adjustment member 26, 126 in an opposite direction about its first axis A1.

In some embodiments of the present invention, the insert holder portion 30, 130 may have a second axis A2, and the first axis A1 may be coaxial with the second axis A2. It can also be understood that the first and second axes A1, A2 may be coaxial for each rotational position of the adjustment member 26, 126, and for each value of the insert cutting angle α.

In some embodiments of the present invention, the adjustment member 26, 126 may be in a fixed translational position on the insert holder portion 30, 130, and actuation of the adjustment member 26, 126 may be performed solely by rotating the adjustment member 26, 126 about its first axis A1.

As shown in FIGS. 3, 5, 9 and 11, the adjustment member 26, 126 may have a planar base surface 42, 142 perpendicular to the first axis A1, and the planar base surface 42, 142 may be in contact with a corresponding seat surface 44, 144 on the insert holder portion 30, 130.

In some embodiments of the present invention, the adjustment member 26, 126 may directly engage the cutting insert 22.

As shown in FIGS. 4, 5, 10 and 11, the adjustment member 26, 126 may have a top surface 46, 146 opposing the base surface 42, 142, and a side surface 48, 148 extending therebetween, with the top or side surface 46, 148 including an adjustment supporting surface 50, 150.

Figure 6:
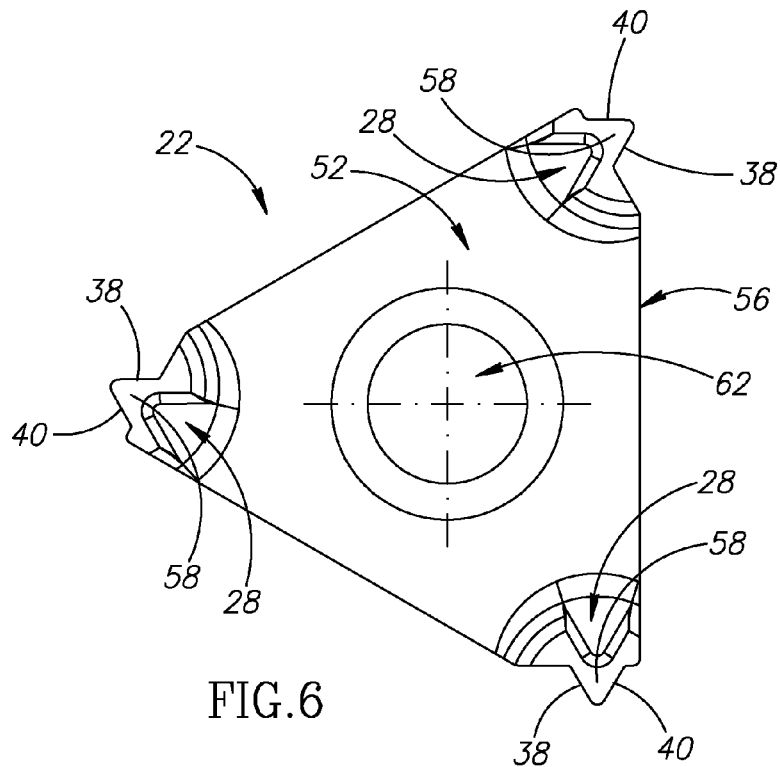
FIG. 6 is a top view of a cutting insert in accordance with some embodiments of the present invention.
Figure 7:
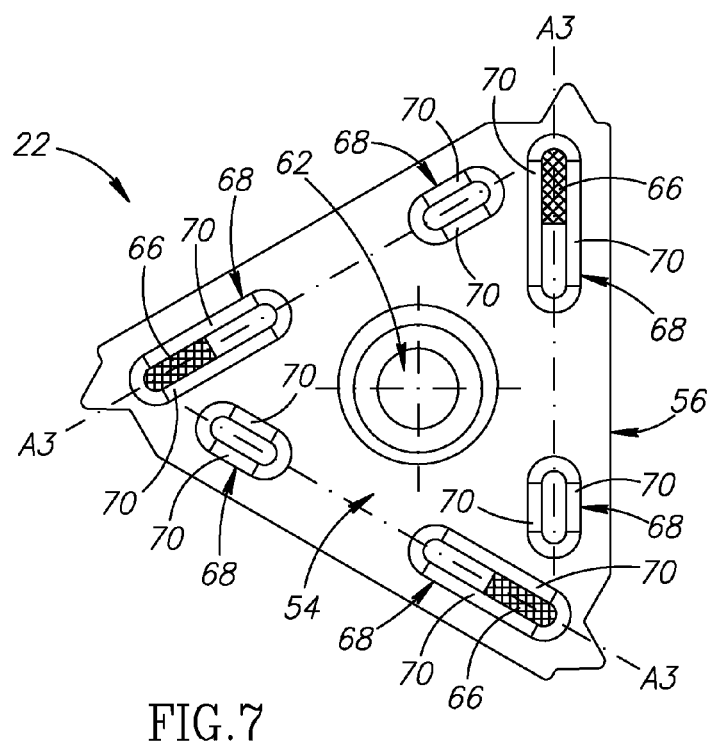
FIG. 7 is a bottom view of the cutting insert shown in FIG. 6.

As shown in FIGS. 6 and 7, the cutting insert 22 may be a lay-down threading insert having opposing upper and lower surfaces 52, 54 and a peripheral surface 56 extending therebetween, with the two cutting edges 38, 40 of each cutting portion 28 having an associated rake surface 58 on the upper or lower surface 52, 54.

Figure 2:
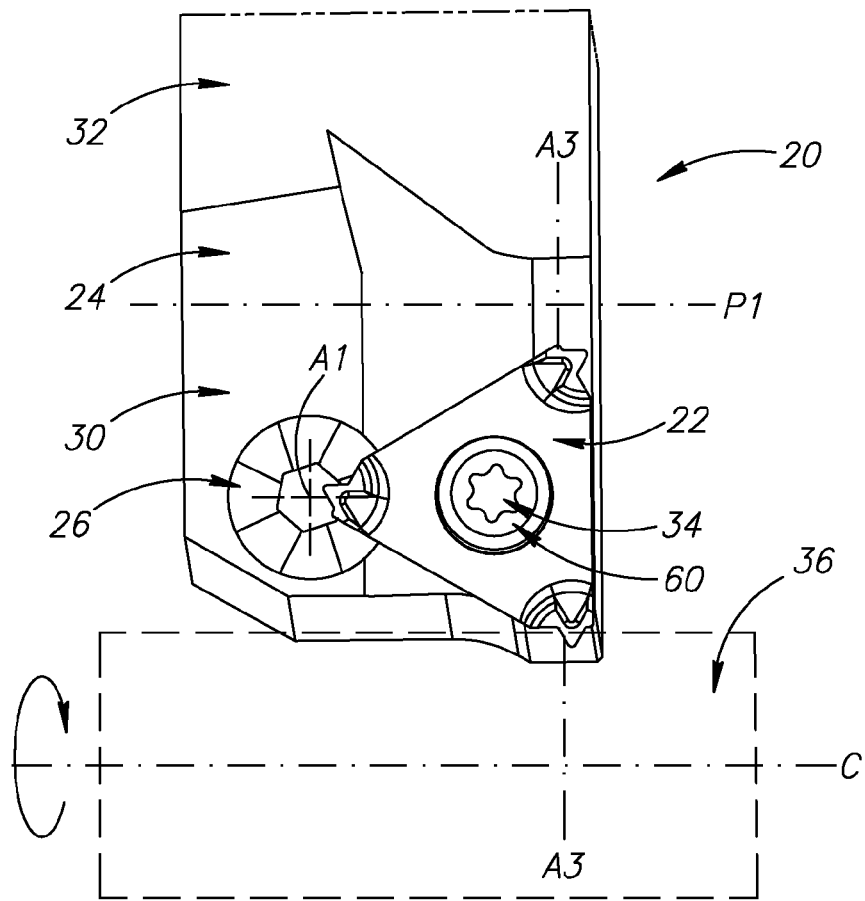
FIG. 2 is a top view of the cutting tool shown in FIG. 1.
Figure 3:
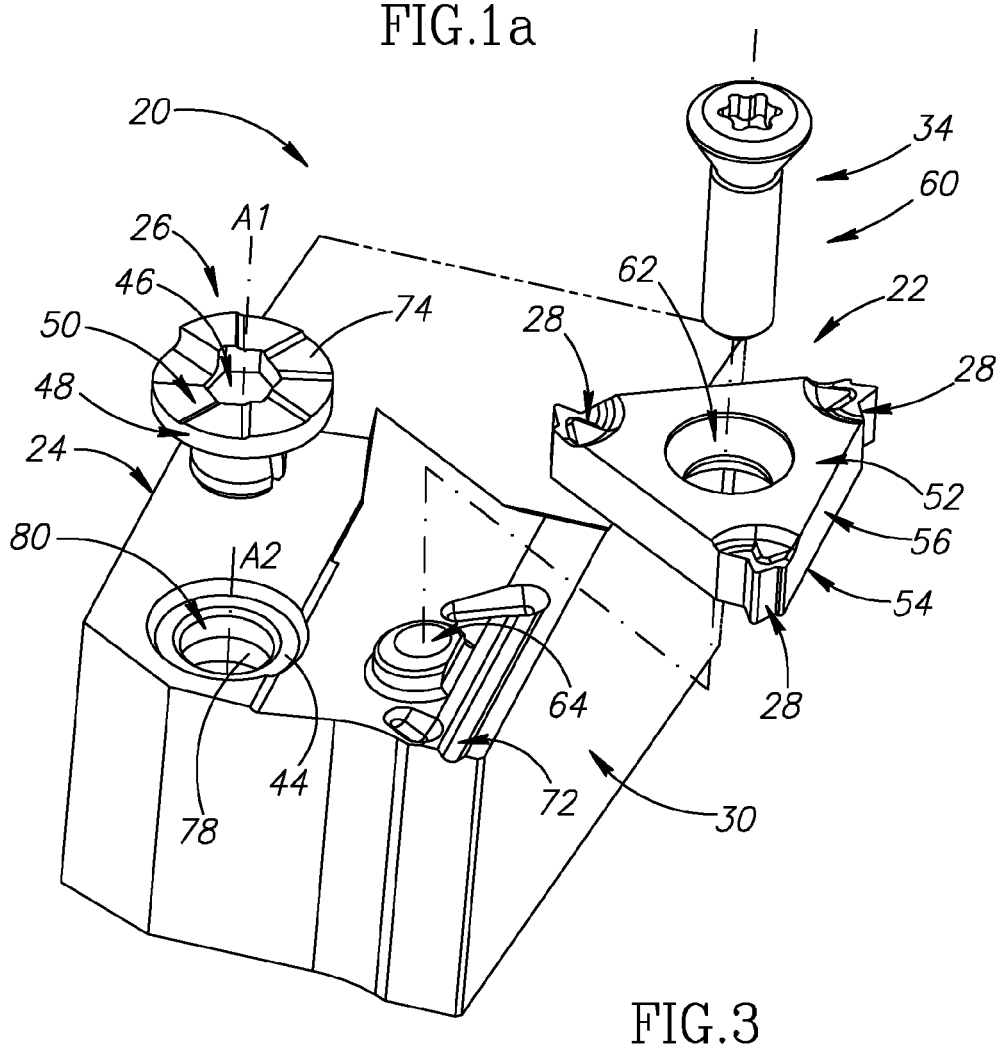
FIG. 3 is an exploded perspective view of the cutting tool shown in FIG. 1.
Figure 9:
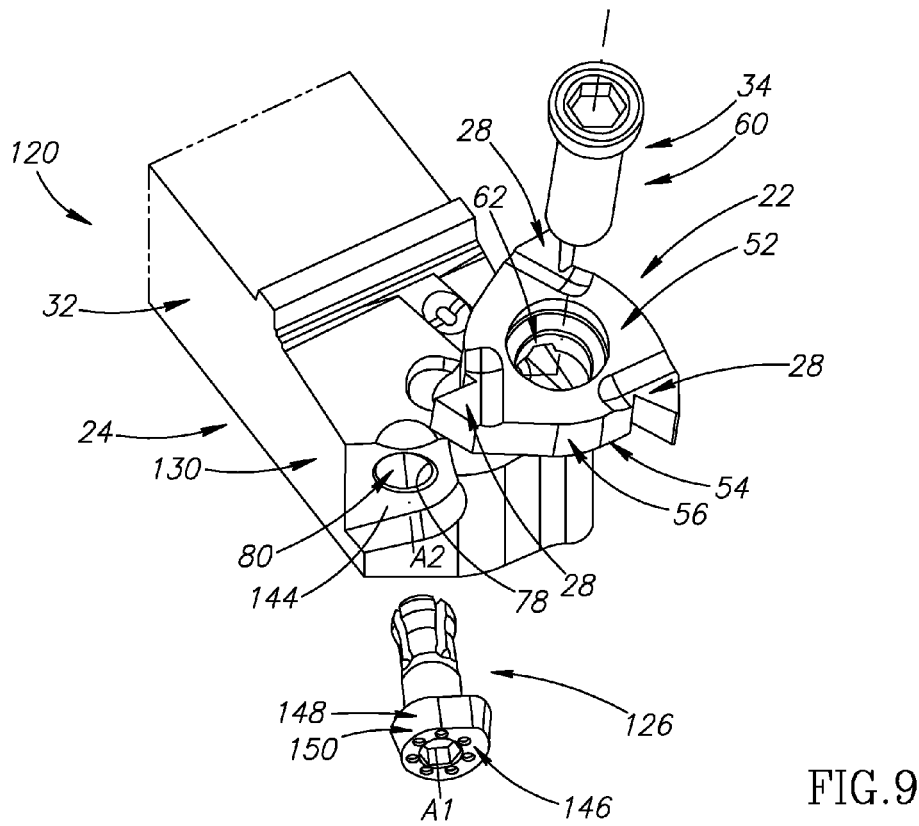
FIG. 9 is an exploded perspective view of the cutting tool shown in FIG. 8.

As shown in FIGS. 2, 3 and 9, the fastener 34 may be in the form of a clamping screw 60.

In some embodiments of the present invention, as shown in FIGS. 3, 6, 7 and 9, the upper and lower surfaces 52, 54 may have a through bore 62 extending therebetween, and the clamping screw 60 may be located in the through bore 62 and threadingly received in a screw bore 64 in the insert holder portion 30, 130.

In other embodiments of the present invention (not shown), the fastener 34 may be in the form of a clamping member, engaging with the through bore 62 and/or one of the upper and lower surfaces 52, 54.

Also, in some embodiments of the present invention, the cutting insert 22 may be generally triangular in shape, having three cutting portions 28 and an equal number of support zones 66, and the adjustment supporting surface 50, 150 may be in contact with exactly one support zone 66 distal from the operative cutting portion 28.

The rake surface 58 of the operative cutting portion 28 may be on the upper surface 52, and the single operative support zone 66 may be on the lower surface 54.

In some embodiments of the present invention, as shown in FIG. 7, the cutting insert 22 may also include a plurality of V-shaped engagement ridges 68 equal to the number of cutting portions 28, each V-shaped engagement ridge 68 located on the lower surface 54 adjacent an associated cutting portion 28. Each V-shaped engagement ridge 68 may have two flank surfaces 70 and an insert tilt axis A3, with the two flank surfaces 70 parallely extending in the direction of the insert tilt axis A3. Each V-shaped engagement ridge 68 may be divided into more than one separate engagement portion, and exactly one of the V-shaped engagement ridges 68 may interface with a corresponding V-shaped engagement groove 72 in the insert holder portion 30, 130.

Each support zone 66 may be located on a single engagement portion of each V-shaped engagement ridge 68, on a surface separating the two flank surfaces 70.

Also, in some embodiments of the present invention, as shown in FIG. 2, the insert holder portion 30, 130 may have a first plane P1, and the insert tilt axis A3 of the operative V-shaped engagement ridge 68 may be perpendicular to the first plane P1 for each value of the insert cutting angle α. It can also be understood that the insert tilt axis A3 of the operative V-shaped engagement ridge 68 may be perpendicular to the first plane P1 for each rotational position of the adjustment member 26, 126.

The first plane P1 may be parallel to the central axis C of the rotating workpiece 36.

In some embodiments of the present invention, the insert cutting angle α may have an adjustment range R which can be attained in less than one revolution of the adjustment member 26, 126 about its first axis A1. The adjustment range R may have a magnitude of at least 6°, and may be in the form of an inclination angle ranging from −1.5° to +4.5°.

Figure 4:
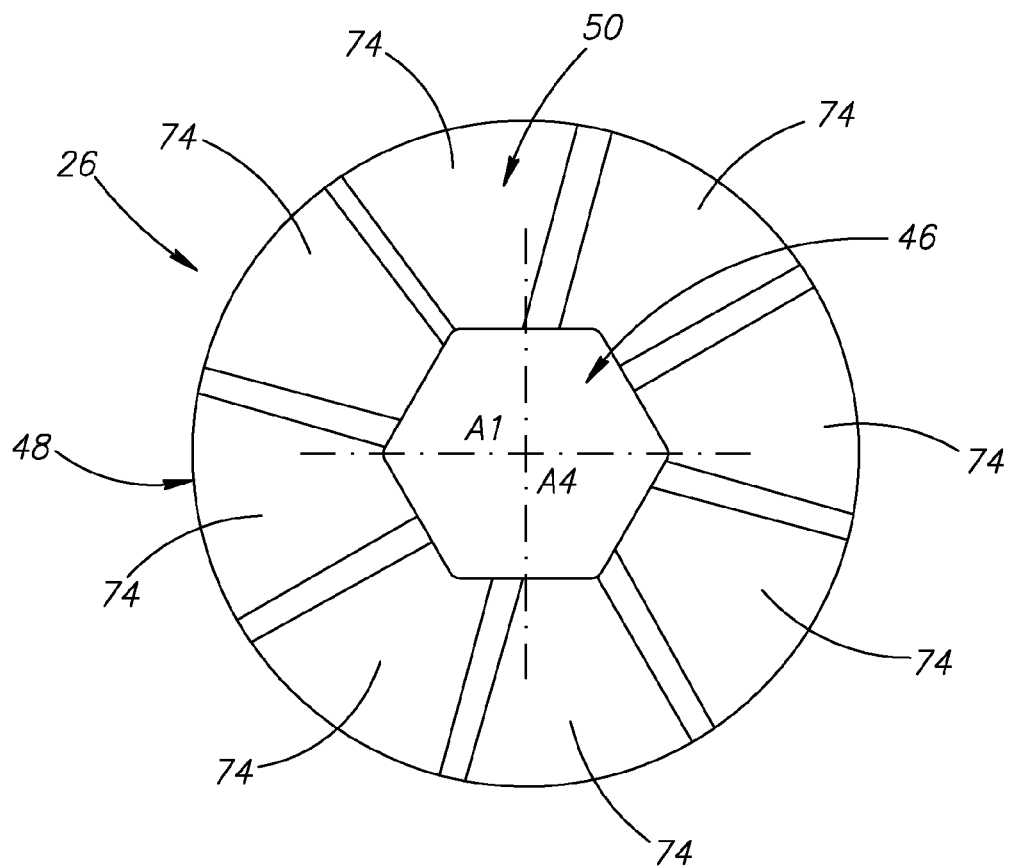
FIG. 4 is a top view of an adjustment member in accordance with the first embodiment of the present invention.
Figure 5:
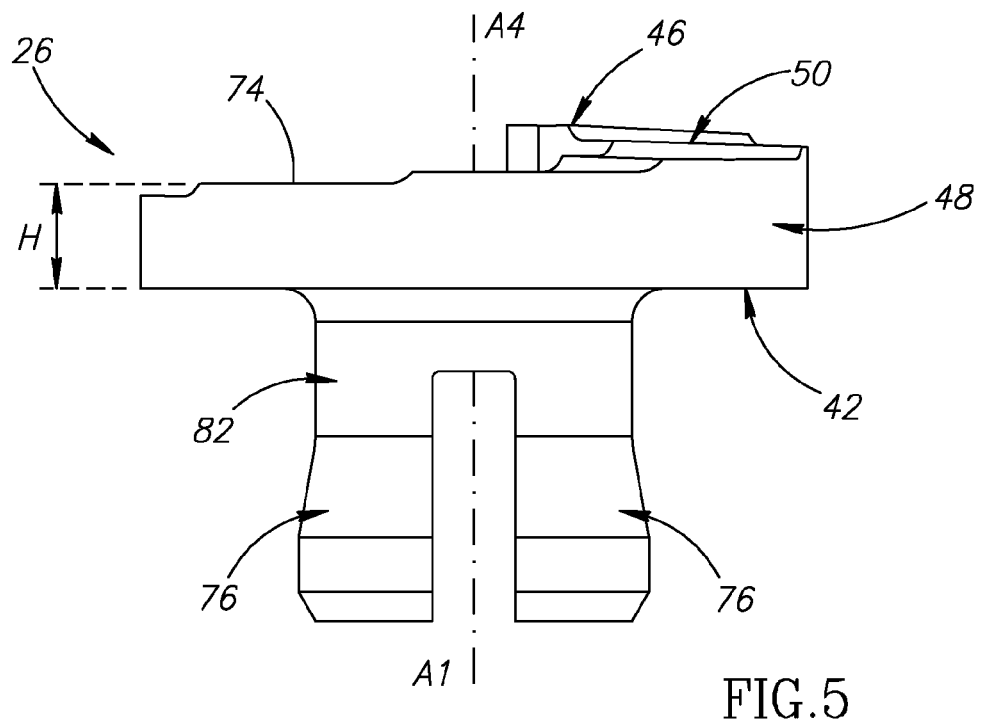
FIG. 5 is a front view of the adjustment member shown in FIG. 4.

In a first embodiment of the present invention, as shown in FIGS. 4 and 5, the adjustment supporting surface 50 may be formed on the top surface 46 of the adjustment member 26. The adjustment supporting surface 50 may be helically step shaped, having a supporting surface axis A4 coaxial with the first axis A1, and an adjustment height H from the base surface 42 which increases or decreases about the supporting surface axis A4. The helically step shaped adjustment supporting surface 50 may comprise a plurality of step segments 74, each step segment 74 perpendicular to the first axis A1 and representing a distinct value of insert cutting angle α.

In the first embodiment of the present invention, the top surface 46 may face in generally the same direction as the rake surface 58 of the operative cutting portion 28, and the side surface 48 may be cylindrical.

Figure 10:
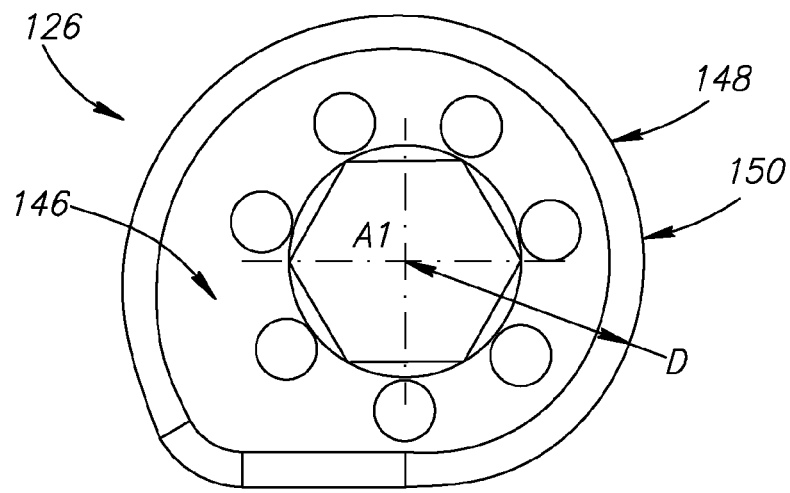
FIG. 10 is a top view of an adjustment member in accordance with the second embodiment of the present invention.
Figure 11:
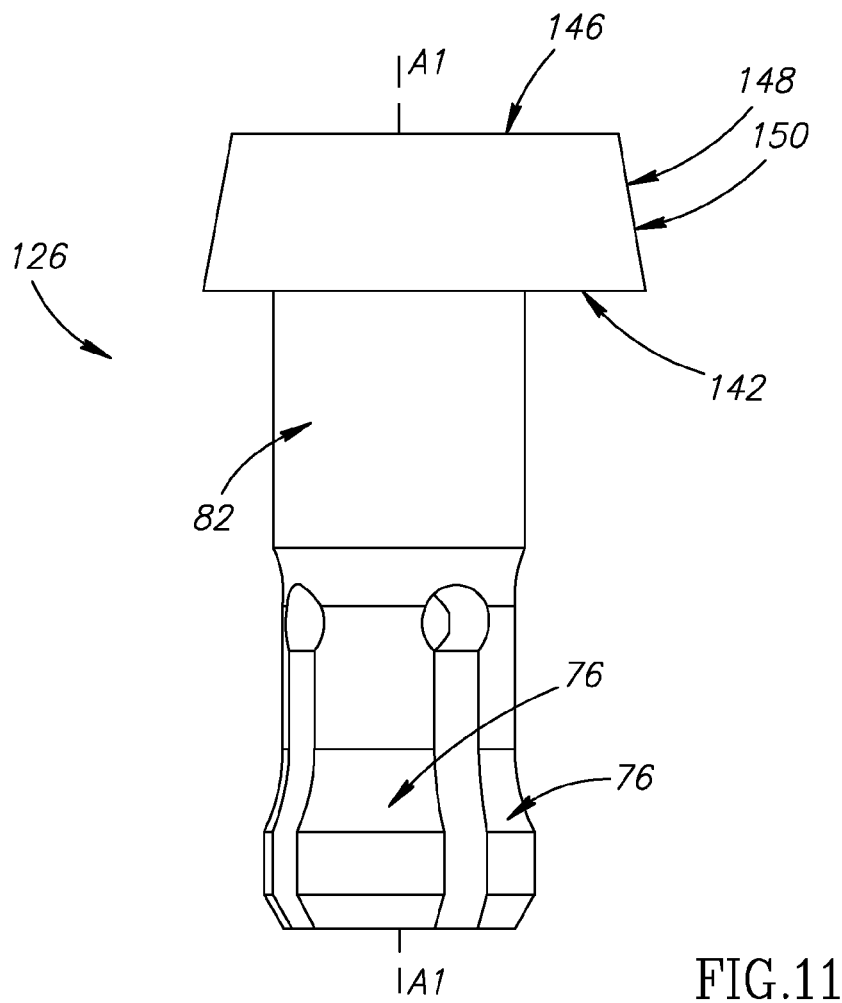
FIG. 11 is a front view of the adjustment member shown in FIG. 10.

In a second embodiment of the present invention, as shown in FIGS. 10 and 11, the side surface 148 of the adjustment member 126 may be non-cylindrical, and the adjustment supporting surface 150 may be formed on the side surface 148, having a radial adjustment distance D from the first axis A1 which continuously increases or decreases about the first axis A1.

In the second embodiment of the present invention, the top surface 146 may face in a generally transverse direction to the rake surface 58 of the operative cutting portion 28.

In both embodiments, a first portion of the adjustment member supporting surface 50, 150 opposes the cutting insert 22 at the active support zone 66 located away from the insert tilt axis A3 associated with the operative cutting portion 28. Rotation of the adjustment member 26, 126 about the first axis A1 and relative to the insert holder portion 30, 130 presents a second portion of the supporting surface 50, 150 opposing the cutting insert 22. This causes a change in both the elevation of the secured cutting insert 22 at the active support zone 66 and in the tilt of the secured cutting insert 22 about the insert tilt axis A3, relative to the insert holder portion 30, 130.

In some embodiments of the present invention, the adjustment member 26, 126 may be actuated directly by the operator, manually by means of an auxiliary tool, e.g. socket wrench (not shown).

Although, in some embodiments of the present invention, the adjustment member 26, 126 may be gradually rotated about its first axis A1, visual indicators or mechanical detents on the adjustment member 126 may be employed to define distinct step increases or decreases of the insert cutting angle α, and thus aid the operator.

In the first embodiment of the present invention, as shown in FIG. 2, the cutting tool 20 may be configured to physically prevent the operator from actuating the adjustment member 26 until the cutting insert 22 has been unclamped, such as by untightening the fastener 34, and partially rotated.

In some embodiments of the present invention, the adjustment member 26, 126 may include a non-threaded retaining portion 82 which keeps the adjustment member 26, 126 mounted on the insert holder portion 30, 130 whilst allowing the operator to actuate the adjustment member 26, 126. In addition, the non-threaded retaining portion 82 may keep the base surface 42, 142 in contact with the seat surface 44, 144 of the insert holder portion 30, 130.

As shown in FIGS. 3, 5, 9 and 11, the non-threaded retaining portion 82 is insertable into the insert holder portion 30, 130 and may include a plurality of resilient legs 76 extending away from the base surface 42, 142, and making contact with a cylindrical wall 78 of a holding cavity 80 in the seat surface 44, 144. The second axis A2 may be coaxial with the cylindrical wall 78 of the holding cavity 80.

Although the present invention has been described to a certain degree of particularity, it should be understood that various alterations and modifications could be made without departing from the spirit or scope of the invention as hereinafter claimed.

What is claimed is:

1. A cutting tool (20, 120) comprising:
   a cutting insert (22), a tool holder (24), and an adjustment member (26, 126);
   the cutting insert (22) having at least one cutting portion (28),
   the tool holder (24) having an insert holder portion (30, 130) and a shank portion (32), the insert holder portion (30, 130) being rigidly fixed to the shank portion (32),
   the adjustment member (26, 126) being non-threadingly retained on the insert holder portion (30, 130), and operatively connected to the cutting insert (22), and
   the cutting insert (22) being removably secured to the insert holder portion (30, 130) by means of a fastener (34), at a cutting position in which the operative cutting portion (28) encounters a workpiece (36) at an insert cutting angle (α),
   wherein actuation of the adjustment member (26, 126) causes an increase or decrease of the insert cutting angle (α).

2. The cutting tool (20, 120) according to claim 1, comprising a single adjustment member (26, 126).

3. The cutting tool (20, 120) according to claim 1, wherein the adjustment member (26, 126) directly engages the cutting insert (22).

4. The cutting tool (20, 120) according to claim 1, wherein actuation of the adjustment member (26, 126) is performed without removing any components from the cutting tool (20, 120).

5. The cutting tool (20, 120) according to claim 1, wherein the adjustment member (26, 126) has a first axis (A1), and
   wherein actuation of the adjustment member (26, 126) is performed by rotating the adjustment member (26, 126) about its first axis (A1).

6. The cutting tool (20, 120) according to claim 5, wherein the insert cutting angle (α) is increased by rotating the adjustment member (26, 126) in one direction about its first axis (A1) and decreased by rotating the adjustment member (26, 126) in an opposite direction about its first axis (A1).

7. The cutting tool (20, 120) according to claim 5, wherein the insert holder portion (30, 130) has a second axis (A2), and
   wherein the first axis (A1) and the second axis (A2) are coaxial.

8. The cutting tool (20, 120) according to claim 5, wherein the adjustment member (26, 126) has a planar base surface (42, 142) perpendicular to the first axis (A1), and wherein the planar base surface (42, 142) is in contact with a corresponding seat surface (44, 144) on the insert holder portion (30, 130).

9. The cutting tool (20, 120) according to claim 8, wherein the adjustment member (26, 126) has a top surface (46, 146) opposing the base surface (42, 142), and a side surface (48, 148) extending therebetween,
wherein the top or side surface (46, 148) comprises an adjustment supporting surface (50, 150),
wherein the cutting insert (22) has at least one support zone (66), and
wherein the adjustment supporting surface (50, 150) is in contact with exactly one support zone (66) distal from the operative cutting portion (28).

10. The cutting tool (20) according to claim 9, wherein the adjustment supporting surface (50) is formed on the top surface (46), and
wherein the adjustment supporting surface (50) is helically step shaped, having a supporting surface axis (A4) coaxial with the first axis (A1), and an adjustment height (H) from the base surface (42) which increases or decreases about the supporting surface axis (A4).

11. The cutting tool (20, 120) according to claim 5, wherein the insert cutting angle ($\alpha$) has an adjustment range (R) which can be attained in less than one revolution of the adjustment member (26, 126) about its first axis (A1).

12. The cutting tool (20, 120) according to claim 11, wherein the adjustment range (R) has a magnitude of at least 6°.

13. The cutting tool (20, 120) according to claim 1, wherein the cutting tool (20, 120) is used in threading operations,
wherein the cutting insert (22) has a plurality of cutting portions (28), each cutting portion (28) having two cutting edges (38, 40), and
wherein the insert cutting angle ($\alpha$) is the inclination angle of the two cutting edges (38, 40) of the operative cutting portion (28) relative to a central axis (C) of the rotating workpiece (36).

14. The cutting tool (20, 120) according to claim 13, wherein the cutting insert (22) is a lay-down threading insert having opposing upper and lower surfaces (52, 54) and a peripheral surface (56) extending therebetween,
wherein the two cutting edges (38, 40) of each cutting portion (28) have an associated rake surface (58) on the upper or lower surface (52, 54).

15. The cutting tool (20, 120) according to claim 14, wherein the fastener (34) is in the form of a clamping screw (60).

16. The cutting tool (20, 120) according to claim 15, wherein upper and lower surfaces (52, 54) have a through bore (62) extending therebetween, and
wherein the clamping screw (60) is located in the through bore (62) and threadingly received in a screw bore (64) in the insert holder portion (30, 130).

17. The cutting tool (20, 120) according to claim 1, wherein each of the at least one cutting portion (28) has an insert tilt axis (A3),
wherein the insert holder portion (30, 130) has a first plane (P1), and
wherein the insert tilt axis (A3) of the operative cutting portion (28) is perpendicular to the first plane (P1) for each value of the insert cutting angle ($\alpha$).

18. The cutting tool (20, 120) according to claim 1, wherein the adjustment member (26, 126) is in a fixed translational position on the insert holder portion (30, 130).

19. The cutting tool (20, 120) according to claim 1, wherein the adjustment member (26, 126) has a first axis (A1), and
wherein actuation of the adjustment member (26, 126) is performed solely by rotating the adjustment member (26, 126) about its first axis (A1).

20. The cutting tool (20, 120) according to claim 1, wherein the adjustment member (26, 126) is capable of being actuated directly by an operator.

21. A method of increasing or decreasing an insert cutting angle ($\alpha$) of a cutting tool (20, 120) relative to a workpiece (36), the cutting tool (20, 120) comprising:
a cutting insert (22), a tool holder (24), and an adjustment member (26, 126);
the cutting insert (22) having at least one cutting portion (28),
the tool holder (24) having a insert holder portion (30, 130) and a shank portion (32), the insert holder portion (30, 130) being rigidly fixed to the shank portion (32),
the insert adjustment member (26, 126) being non-threadingly retained on the insert holder portion (30, 130), and operatively connected to the cutting insert (22), and
the cutting insert (22) being removably secured to the insert holder portion (30, 130) by means of a fastener (34),
the method comprising the steps of:
untightening the fastener (34),
actuating the adjustment member (26, 126) without removing any components from the cutting tool (20, 120), and
retightening the fastener (34).

22. The method according to claim 21, wherein the adjustment member (26, 126) is in a fixed translational position in the insert holder portion (30, 130).

23. The method according to claim 21, wherein the adjustment member (26, 126) has a first axis (A1), and
wherein actuation of the adjustment member (26, 126) is performed solely by rotating the adjustment member (26, 126) about its first axis (A1).

24. The method according to claim 21, wherein the adjustment member (26, 126) directly engages the cutting insert (22), and
wherein the adjustment member (26, 126) is capable of being actuated directly by the operator.

25. A cutting tool (20, 120) comprising:
a tool holder (24) having an insert holder portion (30, 130);
a cutting insert (22) removably secured to the insert holder portion (30, 130), the cutting insert having an operative cutting portion (28) provided with an associated insert tilt axis (A3) and an active support zone (66) located away from the insert tilt axis (A3); and
an adjustment member (26, 126) non-threadingly retained on the insert holder portion (30, 130) and having a first axis (A1) and a supporting surface (50, 150) at least a first portion of which opposes the cutting insert (22) at the active support zone (66); wherein:
rotation of the adjustment member (26, 126) about the first axis (A1) and relative to the insert holder portion (30, 130) results in a second portion of the supporting surface (50, 150) opposing the active support zone (66), and changes in both the elevation of the secured cutting insert (22) at said active support zone (66) and the tilt of the secured cutting insert (22) about the insert tilt axis (A3), relative to the insert holder portion (30, 130).

* * * * *